United States Patent [19]

Ream

[11] Patent Number: 4,486,886
[45] Date of Patent: Dec. 4, 1984

[54] APPARATUS FOR COOLING LASER WINDOWS

[75] Inventor: Stanley L. Ream, Columbus, Ohio

[73] Assignee: Laser Manufacturing Technologies, Inc., Columbus, Ohio

[21] Appl. No.: 427,975

[22] Filed: Sep. 29, 1982

[51] Int. Cl.³ .............................................. H01S 3/04
[52] U.S. Cl. ...................................... 372/34; 372/103; 372/36; 372/108; 350/318
[58] Field of Search ..................................... 372/34–36, 372/98, 99, 103, 108; 350/310, 318

[56] References Cited

U.S. PATENT DOCUMENTS 3,784,929  1/1974  Joy, Jr. et al. ......................... 378/35

*Primary Examiner*—William L. Sikes
*Assistant Examiner*—Léon Scott, Jr.
*Attorney, Agent, or Firm*—George Wolken, Jr.

[57] ABSTRACT

An apparatus is described for cooling the inner circumference of an annular laser window. A cylinder, conductive to heat, is inserted in the central opening of the annular window. Compliant metal wires are used to maintain good thermal contact between the cooling cylinder and the inner circumference of the annular window. A spring compression device is used to maintain constant pressure on the compliant metal wires. The portion of the cooling cylinder outside the window, in the region external to the laser, is slotted. A cooling fluid, typically refrigerated air, is passed through the slots to provide effective heat exchange with the metal cylinder.

9 Claims, 1 Drawing Figure

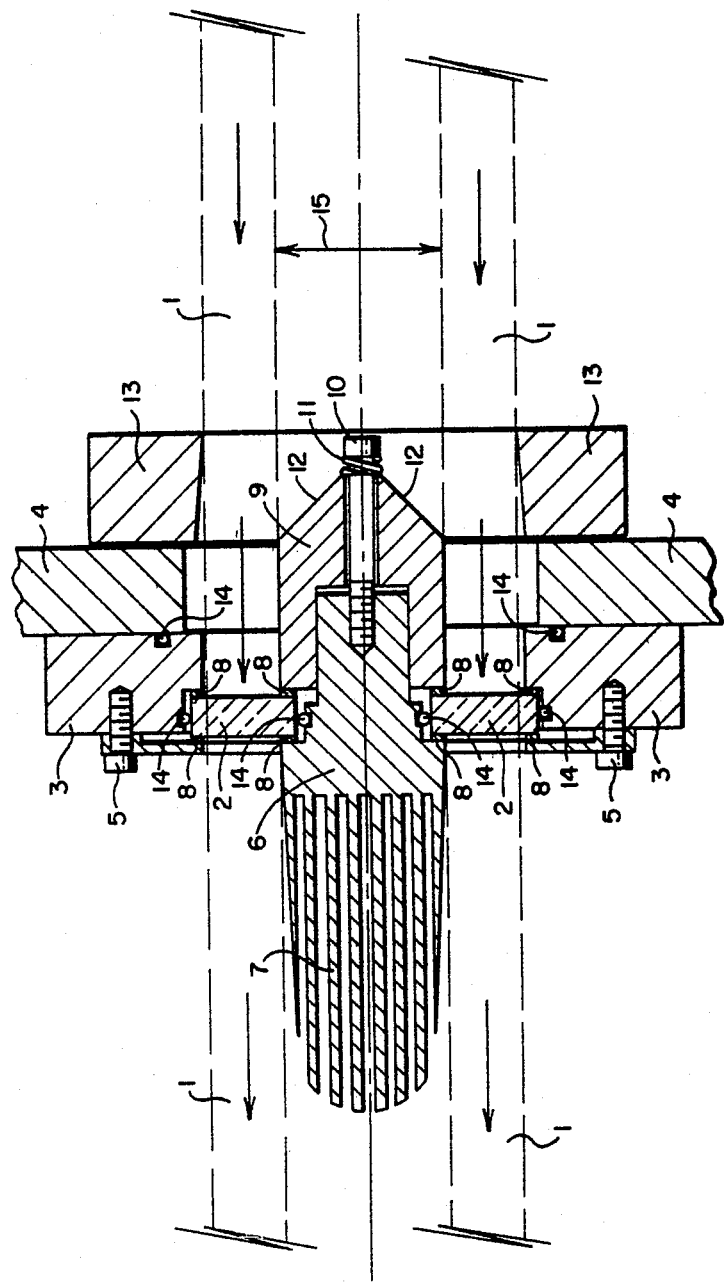

APPARATUS FOR COOLING LASER WINDOWS

BACKGROUND

In order for laser light to be useful, it must exit from the internal resonator cavity wherein it is produced. For low power lasers, the construction of a suitable output window presents no serious problems. A material is selected which is reasonably transmissive at the wavelength of laser operation, and the desired output window is fabricated. Typically, there is no need for special cooling of the window since the incident flux of light energy is small, well within the tolerance of most window materials.

The situation changes drastically for high-power lasers, typically in the range of one kilowatt laser power and up. For such powerful lasers it becomes a matter of concern to remove the laser power from the internal resonator cavity. A laser window made of transparent material is still typically employed. However, any minute imperfection in the material (scratch, micro-crack, dirt, bubble, etc) will preferentially absorb laser energy. At high powers, the laser energy absorbed will significantly heat the local region around this imperfection, further enhancing the preferential heating. The net result is a thermal runaway process, leading to intense local heating, large thermal gradients in the window, and ultimately cracking and catastrophic window failure.

Even optically perfect windows have certain problems. No practical window material will be perfectly transmissive. A small fraction of the incident power will be absorbed by the window and cause heating. For low laser powers, such heating is negligible. However, for high laser powers, even modest light absorption can lead to serious heating. Therefore, windows for high-power lasers are frequently cooled by contact with water-cooled metal mounts along their outer circumference. The need for water cooling and the need for very high optical quality materials make output windows for high-power lasers relatively expensive. Even with high quality optical material and circumferential cooling, such windows are subject to thermal damage and need replacing at fixed intervals, contributing significantly to the cost of high-power laser operation.

At still higher levels of laser power, (typically, around six kilowatts) circumferentially cooled windows become inadequate. In order to keep the incident laser power per unit window area below the damage threshold of the window material, the window and laser beam must both be rather large. Thus, circumferential cooling of the window is inadequate to prevent unacceptable heating of the central portions of the window.

The commonly accepted solution to this dilemma is to remove the window entirely, leaving a gap from the laser cavity to the outside, as used by AVCO Corporation in the AVCO Laser Metalworker. In order to avoid seriously detrimental gas flows through this opening, complex arrangements of differential vacuum pumping are required. Nevertheless, leakage of laser gas through this "aerodynamic window" adds significantly to the cost of operation, while the additional pumping contributes to the complexity and cost of the equipment.

One way to make transparent laser windows useful at higher power levels would be to increase the window cooling, allowing larger heat input to the window without damage. Since high-power lasers frequently produce annular-shaped output beams, the central portion of the output window in such lasers is not used for beam transmission. Thus, a device for cooling the central portion of the window, without interrupting the annular laser beam in any way, should increase the heat input (hence, the laser power) that can be tolerated for a given window. Such a device is the subject of the present invention.

SUMMARY

The present invention comprises an annular-shaped window, transparent to laser light at the operating wavelength of the laser. The outer circumference of the annular window is cooled by means of contact to a compliant metal surface which is cooled by a circulating cooling fluid in the conventional manner. Close thermal contact between the cooling region and the outer window circumference is maintained by inserting compliant, thermally conductive material. The inner circumference is cooled by means of a cylinderical device inserted in the open, central portion of the annular window. This central cooling device will typically be constructed of thermally conductive metal, typically aluminum, or another light material conductive to heat. Close contact between the central cylinder and the inner circumference of the annular window is maintained by placing a compliant, thermally conductive material between the cylinder and the inner circumference of the window, typically indium wire, solder, or an equivalent substance. Constant tension on the window is maintained by a spring device.

That portion of the cylinder protruding outside the window, on the side of the window opposite the laser resonator cavity, is tapered to minimize diffraction of the laser beam. This outer portion also contains many slots, through which a cooling gas is typically circulated. Typically, the cooling gas would be chilled air, $N_2$ or another gas.

The portion of the cylinder protruding inside the window, towards the laser resonator cavity, will typically be approximately conical in shape, and reflective of the laser radiation. Should the laser output beam not be precisely annular in shape, any stray radiation in the center of the annular region will strike the reflective surface and be reflected in a direction approximately 90° to the main axis of the laser beam. Absorbers, artificially cooled, if needed, will typically be positioned to collect the reflected portions of the beam.

BRIEF DESCRIPTION OF DRAWING:

The FIGURE is a cross sectional view through the laser window, the laser beam and the central cooling device.

DETAILED DESCRIPTION

An annular laser beam is shown in cross-section as (1) in the attached Figure, traveling from right to left in the FIGURE. An annular window made of transparent material, typically ZnSe for a high power $Co_2$ laser, is shown as (2) in the FIGURE. The window is securely mounted to the wall of the laser, (4) by means of assembly (3). Assembly (3) is designed to be cooled by a fluid, thereby cooling the outer circumference of the annular window (2), and is held securely in contact with the window for efficient cooling by means of screw assembly (5) and compliant, thermally conductive material (8), typically indium, solder or lead wire. A good vacuum seal must be maintained around the window, which is typically accomplished by means of circular "O"-rings (14).

The cooling of the inner circumference of the window is accomplished by the device inserted into the center opening in the annular window (2), and obscuring none of the laser beam (1). This central cooling device is typically constructed in two parts; one part (6) directed primarily away from the interior of the laser; and a second part (9) connected thereto. This apparatus must be a good conductor of heat and, preferably, rather lightweight so as not to place too great a mechanical strain on the annular window (2). Typically, the apparatus will be constructed of a metal such as aluminum.

Furthermore, it is necessary that the apparatus (6) and (9) maintain a tight thermal contact with the inner circumference of the annular window (2). Typically, this can be accomplished by inserting relatively soft, compliant metal wires (8), between the annular window and the cooling apparatus. A screw (10) securely holds part (9) to part (6) as shown in the FIGURE, in such a way as to compress the compliant metal wires (8) firmly between window (2) and cooling apparatus (6) and (9). A spring (11) inserted just below the cap of screw (10) is one convenient method of maintaining a constant force on the wires (8), even as modest distortion occurs in the wires. Typically, the wires (8) will be good conductors of heat as well as being somewhat compliant under pressure. Indium, solder and lead are typical choices.

Although annular laser beams, such as (1) are frequently obtained in practice, it is possible that some laser energy will spuriously spill over the edges and appear in the center of the annulus in region (15). To prevent undesirable reflections or absorption of this spurious radiation; part (9) is provided with a conical cap (12). The cap (12) is reflective of the laser radiation and constructed at a 45° angle to the direction of propagation of the output laser beam (1). Thus, spurious radiation incident on (12) will be reflected perpendicular to the beam axis, and absorbed by a circular absorber, shown in cross-section as (13). Typically absorber (13) will be cooled by circulating water.

Part (6) of the cooling cylinder extends beyond the window into the regional external to the laser. This portion will be constructed for efficient dissipation of heat from the region of the window. Typically, a series of slots (7) will be placed in the downstream portion to allow a cooling gas to be circulated between them. In addition to providing effective heat exchange in slots (7), this cooling gas must be transparent to the laser radiation. One possible choice would be air, perhaps refrigerated before passing over slots (7).

Typically, it is envisioned that slots (7) will be tapered towards the central axis of region (15), as shown, to minimize deleterious diffraction effects around the inner circumference of annular laser beam (1).

What is claimed is:

1. An apparatus for cooling laser windows comprising:
   a. an annular region of material transparent to laser radiation;
   b. a means for cooling the outer circumference of said annular transparent region;
   c. a cylindrical device: conductive to heat, fitting in the center of said annular region, making thermal contact with said inner window circumference and having a plurality of openings in a first side providing effective heat exchange, obscuring none of said transparent annular region, extending in part into the region on said first side of said window external to said laser wherein said cylindrical device is maintained in thermal contact with said inner window circumference by means of: (a) soft, compliant metal wires placed between said cylindrical device and said inner window circumference; and (b) a means for maintaining compression on said compliant metal wires, extending in part into the region on the opposite second side of said window internal to said laser.

2. A window cooling apparatus as in claim 1 wherein said openings comprise a plurality of parallel elongate slots extending from the region near said inner window circumference to said first end of said cylindrical device external to said laser.

3. A window cooling apparatus as in claim 1 wherein said first end of said cylindrical device is tapered, narrow at the central axis.

4. A window cooling apparatus as in claim 1 wherein said compliant metal wires are In, Au, Sn, Pb or solder.

5. A window cooling apparatus as in claim 1 wherein said cylindrical device is constructed of metal.

6. A window cooling apparatus as in claim 5 wherein said metal is Al, Au, Ag, or Cu.

7. A window cooling apparatus as in claim 1 wherein said second end of said cylindrical device is approximately conical in shape and reflective of laser radiation.

8. A method of cooling the inner circumference of an annular transparent laser window comprising the steps of:
   a. installing into said inner opening of said transparent annular region a cylindrical device having a plurality of openings;
   b. passing a fluid, transparent to said Laser radiation, between said plurality of openings in said first end of said cylinderical device.

9. A method of cooling laser windows as in claim 8 wherein said transparent fluid is air.

* * * * *